Patented Oct. 6, 1953

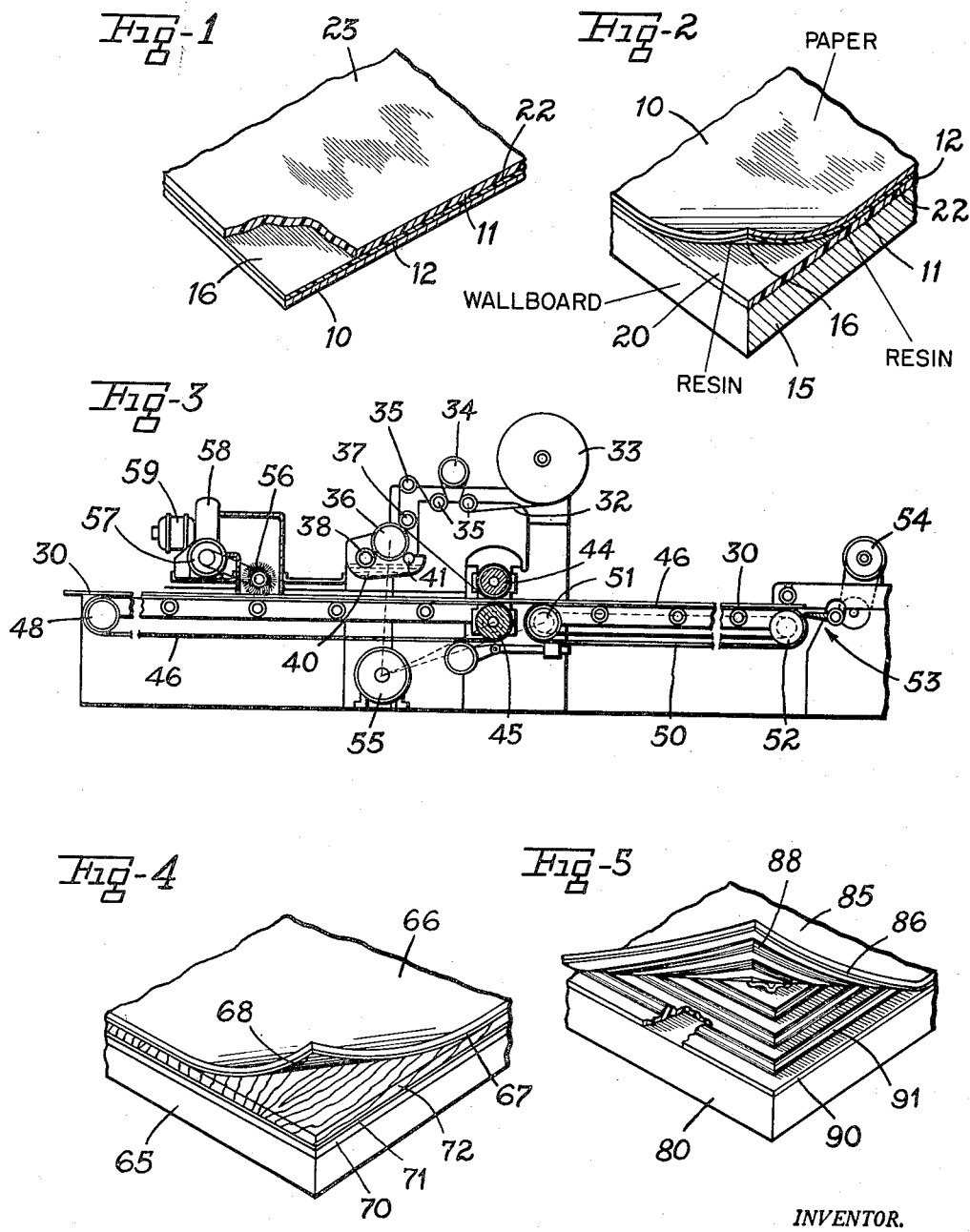

2,654,687

UNITED STATES PATENT OFFICE 2,654,687

COMPOSITE SHEET MATERIAL AND
METHOD OF PRODUCING THE SAME

John S. Fridolph, Flushing, N. Y., assignor to The Sorg Paper Company, Middletown, Ohio, a corporation of Ohio Application July 20, 1950, Serial No. 174,865

11 Claims. (Cl. 154—98)

This invention relates to the formation of decorative coatings on fibrous and cellular base sheets such as wall board and the like as well as metallic or other rigid base sheet materials which do not readily lend themselves to high speed methods of direct surface coating and decoration.

The invention is particularly applicable to the formation of such coatings on commercial wall board or building board of the type made of wood fiber, paper and wood fiber, asbestos fiber, gypsum or the like, etc., or combinations of such fibers molded or pressed together with a suitable binder or cement. Board products of this type have satisfactory strength and insulating qualities, but in general they have a fibrous or cellular structure resulting in a rough or absorbent outer surface which is both difficult and costly to finish with a hard decorative and protective surface coat. Furthermore, the density and size of the fibers at the surface of the board tend to vary, thus causing considerable variation in the porosity or absorptivity of a given surface area, and this is true both for fiber boards of the above type and also for laminated boards such as plywood and the like.

Where the base sheet or board to be coated is of absorbent or porous nature, it is impracticable to attempt the direct application of a plastic or resinous coating material in liquid solution as by spraying, brushing or roll coating, since excessive amounts of the material tend to be required in order to produce the desired surface, and the inherently rough surface of the board resulting from its fibrous construction makes it difficult to obtain a smooth surface without sanding and polishing or the application of a coating of undesirably great thickness, usually in several layers. In addition, the application of such surface materials in solution requires the use of an undesirably large amount of solvent, and this not only is wasteful but also requires subsequent removal and may in turn result in nonuniform soaking and shrinking of the base coat in such manner as to interfere with the surface characteristic of the coating.

If instead of applying the coating material in liquid or plastic form, it is attempted to apply a surface coating to board of the above types in the form of an unsupported plastic sheet, other difficulties arise. The action of the solvent or adhesive used for laminating, or of heat in the case of thermoplastic films, tends to cause irregular expansion, distortion and shrinkage of the film with respect to the base material during lamination and curing, and this in turn also causes the coating layer to assume the irregularities of the surface of the base sheet. If on the other hand, the coating layer is first built up itself in the form of a lamination to give it sufficient body and strength to withstand subsequent application to the building board or other base sheet, the manufacturing process and equipment required are too expensive for other than relatively specialized applications.

The present invention provides a simple and economical method for the application of a decorative surface coating to building board or like fiber or cellular base sheet in which the absorption and shrinkage factors are so reduced and controlled as to be prevented from undesirably affecting the surface characteristics of the finished coating, and it results in the production of a firm and uniform coating on base panels of the above type which are normally of such highly absorptive porous or rough surface characteristics as to be difficult or impractical to coat by ordinary production methods.

In accordance with the invention, the coating for the base panel is preformed as a film on a temporary supporting web having the surface which receives the coating treated in such manner that it readily receives the coating and adheres thereto but can also be readily separated therefrom, satisfactory results having been obtained, for example, using as this carrier web a resin film or a web of paper having a resin layer on the surface thereof which receives the coating film. Before forming the coating film, the receiving surface of the web is treated to impart to it surface characteristics having a predetermined relation to those desired in the finished coating on the base panel. For example, if the finished coating is to be smooth, the surface of the supporting web is made smooth, and if a textured coating is desired, the web surface is correspondingly textured to make its surface effectively a three-dimensional negative image or mold of the desired surface on the finished coating, whether textured or smooth.

The resin film which is to form the finished coating is then applied to the treated surface of the supporting web in such manner as to cause its surface adjacent the web surface to conform accurately with the web surface and thus to form a positive image thereof. This may readily be done by casting the coating from solution or a hot melt on the treated surface of the web to provide a multilayer sheet wherein the surface of the coating which is intended to be outermost on the base panel is lying at the interface of the coating and the treated surface of the web.

This multilayer sheet may then be laminated to the building board or other panel to be coated by means of a suitable solvent and adhesive for the coating film, following which the web is peeled away at the interface of its treated surface and the coating, leaving the coating in place with its desired surface exposed. This stripping step may be carried out as soon as the lamination step is completed, or if desired, the web may be allowed to remain in place temporarily in order to protect the coating surface during storage, handling or fabrication operations on the panel.

The desired surface characteristics on the coating are readily obtained, and also the production and application of the coating are facilitated, when the materials which form this film and the treated surface on the supporting web are initially selected to be of such relative characteristics that both are soluble in or otherwise readily permeable to a mutual solvent but the film may be laid down as a film on the web and subsequently stripped therefrom even after such mutual solvent has been present at the interface of this film and the web, and this relatioiship has several advantageous results in practicing the invention. With those two layers formed of materials of this degree of relative incompatibility, but with both materials being capable of being readily softened or swelled by the same solvent sufficiently for ready permeation by the solvent, there is substantially no molecular interaction at the interface of their surfaces, the adhesion being primarily a surface type of bonding such as is obtained in the case of a film of glue or the like on a sheet of glass. Furthermore, when the coating film is subsequently secured to the base sheet by means of an adhesive comprising a mutual solvent for the two layers, the solvent from the adhesive can penetrate both the coating and the supporting web for rapid and convenient elimination without affecting the surface characteristics of the two resin layers at their interface and without requiring prior removal of the supporting web. Then following elimination of the solvent, the web can be readily peeled away from the coating, leaving the latter permanently secured to the base sheet and without affecting the surface characteristics which were imparted thereto during its initial formation on its temporary support.

It is accordingly one of the principal objects of the present invention to provide a simple and economical method of producing a plastic surface coating on a fibrous, cellular or other base sheet under such conditions that undesirable shrinkage of the base sheet and of the coating are prevented, as well as undesirable absorption of solvent or adhesive, and the desired surface characteristics are obtained on the coating substantially unaffected by roughness and irregularities in the density and absorptiveness of the coated surface of the base sheet.

Another object is to provide such a coating method wherein the coating is preformed on a supporting web with the desired surface characteristics applied thereto during formation at the interface with the supporting web and is then transferred and laminated to the base sheet under controlled conditions of heat, pressure and solvent or adhesive application such that the desired surface characteristics are maintained thereon.

An additional object is to provide such a coating method which may be carried out in a plurality of stages in such manner that the preformed coating film and its supporting web are capable of storage or shipment prior to application to the base sheet to be coated without affecting the desired surface characteristics of the finished coating.

It is also an object of the invention to provide a multilayer product for use in the application of a surface coating to a fibrous, cellular or other base sheet which includes a resin coating layer secured to a temporary supporting web such as paper or the like which is incompatible with the material of the coating but is sufficiently permeable to a solvent for the coating suitable for laminating the coating to the base sheet to receive and transmit such solvent, and thus to facilitate elimination of the solvent following lamination by transmission through the web without disturbing the surface characteristics of the coating.

A still further object is to provide a coating method and multilayer coating product having the above characteristics wherein the temporary support for the coating may remain thereon following application of the coating to the base sheet to protect the coating during subsequent forming or other handling and which may be thereafter removed without affecting the desired surface characteristics of the coating.

Other objects and advantages of the invention will be apparent from the following description, the accompanying drawing and the appended claims.

In the drawing—

Fig. 1 is a somewhat diagrammatic view of a fragment of a multilayer coating product in accordance with the invention prior to application thereof to a base sheet to be coated;

Fig. 2 is a view similar to Fig. 1 showing the product following application to a base sheet and also illustrating the step of removal of the temporary support from the coating;

Fig. 3 is a diagrammatic view illustrating apparatus for laminating the product of Fig. 1 to a plurality of base sheets to be coated; and Figs. 4 and 5 are views similar to Fig. 2 showing coated sheets in accordance with the invention wherein the coating includes a decorative design.

Referring to the drawings, which illustrate preferred embodiments of the invention, Fig. 1 shows a fragment of a multilayer coating product which comprises a supporting web 10 of paper on which the resin coating film 11 is preformed and temporarily secured by means of an intermediate resin layer 12. Fig. 2 shows this product after the film 11 has been transferred and laminated to a base sheet 15, with the paper web 10 and resin layer 12 being shown as in the process of being peeled or stripped away.

This multilayer sheet can be readily produced by conventional coating apparatus and methods employed for coating paper, such for example as a reverse roll coater or a knife edge coater, with the intermediate resin layer 12 being first applied to the paper web and caused to dry or harden. During or after this application step, the surface 16 of the layer 12 may be calendered or otherwise treated to impart thereto the same degree of surface smoothness or other surface characteristics which is desired on the surface 20 of the coating film 11 following application thereof to the base sheet.

The film 11 is then similarly deposited and formed on the support composed of the web 10 and resin layer 12, and the materials of the two resin layers and the coating technique in forming film 11 are so selected and controlled that the film 11 is formed without disturbing the surface characteristics of the surface 16 of layer 12. As a result, the surface 20 of coating 11 which lies at the interface 22 of layers 11 and 12 in the multilayer coating product will possess the same degree of smoothness or other surface characteristics initially imparted to the surface 16 of layer 12 prior to the formation of film 11 thereon and will thus form a positive image of surface 16. The degree of smoothness of the exposed surface 23 of coating film 11 is not of particular importance, provided the thickness of the film is sufficiently uniform throughout, since this surface is intended to be subsequently bonded to a base sheet and thus will become the inner surface of the coating in the final coated product.

This multilayer product is then ready for lamination to a building board or other base panel or sheet as discussed above to provide a smooth coating on the base sheet, which is indicated at 15 in Fig. 2. In this laminating step, the surface 23 of coating 11 is bonded to the surface of the base sheet 15 under controlled conditions of pressure and softening of film 11 such that although its surface 23 may be softened during lamination to the base sheet, the bond between film 11 and layer 12 will not be adversely affected. Thereafter the paper web 10 and the layer 12 thereon are peeled or stripped away at the interface 22, as indicated in Fig. 2, leaving the surface 20 of coating 11 exposed to form the outer surface of the base sheet. This laminating step may be carried out promptly after formation of the multilayer product of Fig. 1, or the product may be readily rolled for shipment or stored until it is desired to apply it to the base sheet. Furthermore, the paper web need not be removed immediately after lamination, but instead it may be allowed to remain on the base sheet during shipment or other handling of the base sheet as a protective measure and then finally removed after the sheet is installed in its intended place.

The physical and chemical characteristics of the materials in the three layers 10, 11 and 12 are selected in accordance with the invention for proper operation during the above described steps. The web 10 functions as a temporary support for the coating and also as a protective layer for the coating both before and after lamination to the base sheet. In addition, it is desirable that this web be capable of receiving and transmitting solvents and solvent vapors of the character employed in handling the resin layers 11 and 12, this characteristic being desirable both to aid in the initial formation of the layers 11 and 12 and also to facilitate elimination of adhesive solvent when the subsequent lamination to the base sheet is carried out by application of an adhesive solvent to the coating film 11.

Satisfactory results from these standpoints have been obtained with the web 10 composed of flexible paper of medium weight, ranging from 50 to 65 pounds per ream of 500 sheets 24 x 36 inches in size or ranging from 0.0025 to 0.0050 inch in thickness. Standard types and grades of paper which have been found suitable include high or super-calendered lithograph or printing papers as well as well formed and medium dense calendered book papers and label stock grades of paper, all of which have comparatively smooth surfaces and the ability to absorb a variety of resin solvents and solvent vapors and to permit their escape through the back of the web 10 during the coating and laminating cycles of the method described. These types of paper accordingly offer satisfactory surfaces on which the resin layer 12 can be smoothly and uniformly applied in a thin and continuous coat having a high degree of adhesion to the paper.

The resin layer 12 also performs several functions in the practice of the invention. It should be of such characteristics as to be readily coated on the web 10 in the form of a thin film of substantially uniform thickness, or of forming a separate film of adequate strength to support coating film 11 if it is desired to dispense with the paper layer in the supporting web, and it should be susceptible of receiving and retaining desired surface characteristics such as a high degree of smoothness or a desired texture on its outer surface as described. It should be sufficiently soluble in or capable of being sufficiently softened or swelled by one or more solvents for the material of film 11 to be readily permeable to such solvents, it being understood that the term "solvents" as used herein is intended to include partial solvents and other softening or swelling agents as well as true solvents. At the same time, the material of the layer 12 should be capable of forming a film having a continuous and intimate interface with the film 11 but without molecular interaction or reaction with the material of film 11 even in the presence of a mutual solvent for the materials of the two layers, so that the two layers can be readily stripped apart even after such solvent has been present at or has passed through their interface, and to this extent the materials of the two layers may be defined as "incompatible" with each other.

When the materials are selected to have these characteristics, if the film 11 is coated on the surface 16 of layer 12 from solution in a mutual solvent under properly controlled coating conditions, such as with a roll or knife coater, the surface 16 will retain the desired surface characteristic initially imparted thereto so that the surface 20 of the coating film will automatically form a positive image of the surface 16. Also, the two layers will have their surfaces at the interface 22 in intimate contact over substantially their entire area, since the layer 12 will be softened by solvent released from film 11, and the two layers will thus set and dry together in the desired intimate contact. At the same time, with the materials of the two layers selected to be incompatible as defined above, no molecular interaction will take place between the two layers of the interface 22 such as might cause disruption of the surface characteristics of the two layers when they are subsequently separated along this interface.

The bond at the interface 22 accordingly appears to be effectively a mechanical bonding, comparable with that existing between a film of glue or the like and an inert smooth surface such as a sheet of glass on which this film is deposited and permitted to dry, with the result that the composite multilayer product can be readily rolled on itself and otherwise handled without disruption of the bond at the interface 22 while at the same time the paper web and layer 12 can subsequently be peeled away at this interface as shown in Fig. 2 after the film 11 has been permanently bonded to the base sheet 15. Furthermore, similar desirable results can be obtained without the use of a mutual solvent in forming film 11, as by casting this film from a hot melt or a solution or suspension in a non-solvent for layer 12, or in other desired manner, provided the materials of the two layers have the desired relative characteristics as set forth above.

The coating 11 is composed of a resinous material selected in accordance with the desired characteristics to be obtained in the coating as applied to the building board or other base panel or base sheet as described. It should accordingly be sufficiently hard to withstand the forces and service conditions in which it is likely to be subjected to use, and it may if desired include pigments or like materials for decorative purposes. For example, an adequately firm and hard coating for an asbestos wall board which is substantially pure white and which may be readily painted or otherwise decorated as desired has been obtained with the film 11 initially formed on the layer 12 from a solution of the following ingredients:

| | Percent |
|---|---|
| Vinylite VYHH | 37 |
| Titanium oxide | 15 |
| Methyl ethyl ketone | 45 |
| Paraplex G-40 | 3 |

Vinylite VYHH is a vinyl copolymer resin manufactured by Bakelite Corporation and comprises a mixture of copolymers of vinyl chloride and vinyl acetate, and Paraplex G-40 is a plasticizer manufactured by Resinous Products Company and is believed to comprise essentially an alkyd resin used as a mechanical plasticizer for the Vinylite. The titanium oxide is used merely as a pigment, and the methyl ethyl ketone is the solvent.

With the layer 11 formed from the above solution, and with the web 10 composed of a super-calendered bleached kraft paper as described above, satisfactory results have been obtained with the layer 12 composed of cellulose acetate and formed by deposit on web 10 from a solution in methyl ethyl ketone in sufficient volume to assure complete coverage of the surface of the web, satisfactory results having been obtained with a solution such that the weight of the dry resin is within a range of the order of 4 to 7 pounds per 3000 square feet of the web surface. This coating may be applied as described by means of conventional coating apparatus employed in the paper industry to form smooth coatings on continuous paper web, and after this coating has adequately dried, the vinyl resin solution is similarly applied and caused to dry. The thickness of the coating 11 is determined in large measure by the characteristics of the base sheet to which it is subsequently to be applied, a thickness of the range of 0.0003 to 0.0005 inch having been found satisfactory for a base sheet having a comparatively smooth and relatively nonabsorbent surface, whereas a thickness of the order of 0.0015 to 0.0025 inch is desirable in the case of base sheets having porous irregular and absorbent surfaces.

Fig. 3 illustrates diagrammatically suitable apparatus for laminating the multilayer product of Fig. 1 to a series of panels 30 of wall board or other base sheet material. The multilayer coating product is shown as a web 32 unwound from a supply roll 33 over suitable guide and tensioning rolls 34 and 35 and through the nip between a pair of rolls 36 and 37, the roll 36 being an application roll which receives from a roll 38 a film of suitable adhesive for application to the exposed surface 23 of the coating 11. As shown, the roll 38 dips into a reservoir 40 containing adhesive, and the quantity of adhesive on roll 36 is metered by a roll 41 prior to its application to the web 32 as it passes through the nip between rolls 36 and 37.

The panels 30 to be coated are shown as fed continuously, with their ends in butted relation, toward the nip between upper and lower laminating pressure rolls 44 and 45 by means of a belt conveyor 46 running over the pressure roll 45 and a roll 48 at the entering end of the apparatus. A second conveyor 50 running over rolls 51 and 52 is arranged to receive the laminated panels from the laminating rolls as shown, and a periodically operable shearing mechanism is indicated at 53 as driven by a motor 54 for severing the web between adjacent panels.

The drive for the application roll 36, laminating rolls 44 and 45 and conveyor 50 is shown as provided by a motor 55 operating through suitable belts or sprockets as indicated, the speed of the conveyors 46 and 50 being preferably the same as or slightly faster than the peripheral speed of the laminating rolls 44 and 45, depending upon the particular drive arrangement. Also, a brush 56 driven by motor 57 is provided ahead of the laminating rolls for cleaning and scoring the upper surfaces of the panels 30 to prepare them for lamination, and a blower 58 driven by motor 59 is provided for collecting dust or other particles removed from the panels by brush 56.

The adhesive employed in the reservoir 40 is selected in accordance with the materials in the layers 11 and 12 on the coating web, and desirable results have been obtained with this adhesive including a mutual solvent for the materials of the layers 11 and 12 together with a suitable adhesive for which the selected laminating solvent is also a solvent. For example, with the layers 11 and 12 formed of the materials described above, satisfactory results have been obtained with the adhesive composed of methyl-ethyl ketone to which is added approximately 25% by weight of a methacrylic resin adhesive composed of one part isobutyl methacrylate and two parts N-butyl methacrylate.

It is of importance in order to obtain optimum surface characteristics on the finished coating that the laminating operation be carried out under controlled conditions of time and pressure such that the described intimate contact between the layers 11 and 12 at their interface 22 remains completely undisturbed. This result can be obtained by so controlling the distance traveled by the web 32 from the point at which the adhesive is applied thereto to the laminating rolls, the rate of travel of the web, and also the amount of solvent-adhesive applied to the web, that there will be neither sufficient solvent nor sufficient time for the solvent to penetrate the film 11 to the interface 22 prior to passage of the web through the laminating rolls. That is to say, the application of the solvent-adhesive is controlled to provide adequate softening of the surface 23 to insure firm bonding to the panels 30, but at the same time softening at the interface 22 prior to lamination is prevented in order to assure that the pressure of the laminating rolls will not disrupt the temporary bond between film 11 and layer 12 at their interface 22.

Satisfactory results have been obtained with the materials described for lamination to asbestos wall board under the following conditions:

Coating layer thickness—0.0015–0.0020 inch.
Solvent-adhesive—3 pounds per 1000 square feet.
Distance of web travel from adhesive applicator to laminating rolls—3 feet.
Rate of travel of web—30 feet per minute.
Pressure between laminating rolls—15 to 20 pounds per square inch.

Under these conditions, the surface 23 of the coating film is adequately softened for permanent bonding to the base panels under the laminating pressure employed, but there is not sufficient time and solvent present in the coating for penetration of the solvent to the interface 22 before the laminating pressure is applied. Since the pressure between the laminating rolls is an almost linear rolling pressure, it is sufficient to press the softened surface 23 into the desired contact with the panels but is not sufficiently great nor sufficiently prolonged to cause disruption or distortion of the smooth surfaces of the film 11 and layer 12 at the interface 22.

Penetration of the solvent to the interface 22 after the panel and web have passed the laminating rolls not only does not affect the bond at the interface 22, but on the contrary it is desirable since it facilitates rapid elimination of the solvent by penetration through layer 12 and the paper web 10 for evaporation at the surface of the paper layer, which may be accelerated if desired by the application of heat and by the use of low boiling solvents where possible.

Furthermore, when the laminating solvent is a mutual solvent for the adhesive and the coating layer and can thus be eliminated through the supporting or carrier web while the web is still in contact with the coating, the desired surface characteristics are maintained on the coating, and the web aids in preventing the coating layer from shrinking into the pores of the base board and the resulting undesired reflection of the surface of the board on the surface of the coating. In other words, by drying the laminant first from the inside of the coating while the web is in place, the film is caused to shrink in such manner that its inner surface conforms to the surface of the board without undesirably affecting the preformed characteristics of its outer surface, and also the formation of blisters between the coating and web resulting from the accumulation of solvent at the interface is avoided.

The volume of solvent present is small in comparison with the total volume of resins in the layers, and with the solvent chosen as described to be a mutual solvent for the incompatible resins of layers 11 and 12, it produces little softening. Furthermore, as the solvent migrates across the interface 22, such softening of the two layers at this point which may be caused by the solvent in passing will be such that both layers tend to swell or shrink together as the case may be, and thus the smooth interface 22 will be maintained throughout the passage of solvent through the web. However, with the laminating conditions controlled as described in such manner that the solvent does not penetrate to the interface 22 until after the web has passed through the laminating rolls, there is no stress on the web during elimination of the solvent, and accordingly there is no tendency for disruption or distortion of the smooth and intimate contact between the two layers along their interface. When, however, it is desired to remove the web, it can be readily separated from the coating film 11, particularly at a corner, and can then be peeled away at the interface 22 without affecting the smoothness of the surface 20.

The removal of the carrier web from the coated board or sheet can be accomplished whenever desired after completion of the laminating operation. It has been found desirable, however, to allow the paper layer to remain on the board to provide protection for the coating 11 during storage, shipping, handling or such fabrication as may be required of the board before it is finally ready for installation or other use. The paper layer thus provides desirable protection against both chipping, scratching or like injury to the coated surface as well as against accidental soiling. It also facilitates handling of the board, since it forms an effectively non-skid surface which under many conditions may make for easier handling of the board than when its smoothcoated surface 20 is exposed. It has been found, for example, that building board coated as described may be subjected to any fabricating operations such as sawing, beveling, drilling, grooving, shearing and shaping while the paper layer is still secured thereto and without affecting the bond at the interface 22, and thereafter when the paper layer has been removed, the exposed surface 20 has been found to be of the same desired degree of uniform smoothness as the surface 16 of the layer 12 on which this coating layer was originally preformed.

The invention has also been practiced satisfactorily with numerous other resin compositions than those described above, provided these other compositions were selected as described to be mutually incompatible but soluble in or permeable by a mutual solvent. For example, the invention has been successfully practiced with each of the following combinations:

| Resin Layer 12 | Coating Film 11 | Mutual Solvent |
|---|---|---|
| Cellulose Acetate. | Vinylite VYHH, VYNS or VYNW Blends of Vinylite VYHH, VYNS or VYNW with Vinylite VYLF. | Methyl-ethyl ketone. |
| Ethylcellulose | Same as above. Also blends of ester gum and nitrocellulose with Alkyd. | Acetone or toluene. |
| Blend of Nitrocellulose and Alkyd. | Vinylite VYHH or VYNS. | Methyl-ethyl ketone. |
| Vinyl Butyral | Cellulose Acetate Vinylite VYHH or VYNS. | Acetone or ethyl acetate. |

As stated, the invention has been successfully practiced with each of the above examples, and as shown by the above table, the relationship of the two layers may be reversed if desired. That is to say, in each of the foregoing examples, satisfactory results have been obtained both with the layers 11 and 12 respectively composed of the materials indicated and also when the material indicated for the coating 11 in a given example is instead employed for the layer 12 and vice versa.

This invention is applicable to the provision of coatings having predetermined characteristics of color or design, and Fig. 4 illustrates the production of such a coating having a grained appearance simulating the surface of a panel of wood. In Fig. 4, the base sheet 65 represents a panel of wall board or the like as described and shown at 15 in Fig. 2, and the sheet 66 represents a paper web having a resin layer 67 thereon corresponding with the layer 12 in Figs. 1 and 2 and having a smooth outer surface 68. The coating on the panel 65 comprises three layers, a sublayer 70 which is suitably pigmented with a desired background coloration, an intermediate layer 71 which constitutes the wood graining and may consist of an ink or dye capable of application by a standard rotogravure printing press, and a top layer 72 of transparent plastic overlying and protecting the layer 71, this outer layer 72 being shown as having a smooth outer surface. Also, it is desirable to have all three layers 70, 71 and 72 formed of the same base resin to promote unitary bonding therebetween, and this resin should be incompatible with the material of layer 67 but soluble in a suitable solvent capable of permeating layer 67.

In the formation of this design type of coating in accordance with the invention, the supporting web 66—67 is first prepared as described in connection with Fig. 1, with the outer surface 68 of the layer 67 being made smooth. The plastic layer 72 is then cast on the web surface 68 by the same methods described in connection with Fig. 1, and the exposed surface of this layer 72 is then printed with the design layer 71. The final coating layer 70 is then cast on the exposed surface of layer 71, and the multilayer sheet is ready for lamination to the base panel, which may be done as described in connection with Fig. 3. Thereafter the supporting web is stripped away as shown in Fig. 4 to leave the multilayer coating in place.

Fig. 5 represents the application of the invention to the production of a textured surface coating on a base panel 80 of wall board or the like. The paper web 85 has a resin layer 86 thereon which corresponds with the layer 12 in Figs. 1 and 2, and the exposed surface 88 of this layer is shown as embossed to form a three-dimensional negative image of a desired embossed surface coating to be provided on the base panel 80. The coating film 90 corresponds to the film 11 in Figs. 1 and 2, and it has an embossed surface 91 which constitutes a positive image of the negative image 88 on film 86.

In the formation of this textured coating, the layer 86 is formed on the web 85 as described in connection with Fig. 1, and either during or after formation of the film it is treated by means of suitable rolls or the like to form the desired embossed surface 88 thereon. The film 90 is then formed on surface 88 of the web, and satisfactory results have been obtained by casting this film from a mutual solvent on the surface 88, thus readily causing the surface 91 of film 90 to form a positive image of the surface characteristics of layer 86, with the surface 88 acting effectively as a mold during this step to impart surface characteristics to film 90 in the same manner that the surfaces 16 and 68 act as molds to form smooth surfaces on films 11 and 72 in Figs. 1 and 4. The subsequent lamination step to the base panel 80 may be carried out as described in connection with Fig. 3, followed by stripping away the supporting web as shown in Fig. 5.

Decorative coatings of the type shown in Figs. 4 and 5 may thus be readily and economically produced in accordance with the same principles of the invention described in connection with Figs. 1 to 3, namely with the materials which compose the respective coating film and the adjacent surface on the supporting web being selected to be incompatible with each other but soluble in or permeable by a mutual solvent. These coatings have the further advantage afforded by the invention that they may be readily formed as a multilayer sheet capable of storage, handling and shipment prior to application to the base panels to be coated without damaging or altering the desired surface characteristics of the coated panels which are initially determined during the formation of the resin surface on the supporting web. Similarly as described in connection with Fig. 2, the web may be allowed to remain on the coated panel after lamination to serve as a temporary protective cover during handling, fabrication and installing of the panels.

While the methods and articles herein described constitute preferred embodiments of the invention, it is to be understood that the invention is not limited to these precise methods and articles, and that changes may be made therein without departing from the scope of the invention which is defined in the appended claims.

What is claimed is:

1. A composite sheet material for use in applying a coating film to a sheet of base material, comprising a supporting web having a film receiving surface composed of a thermoplastic resin, and a coating film in intimate contact with said web surface, said coating film being composed of thermoplastic resin different from said first mentioned thermoplastic resin, said thermoplastic resins being chosen with respect to each other so as to be mutually insoluble and incompatible and yet permeable to a mutual solvent.

2. A composite sheet material for use in applying a coating film to a sheet of base material, comprising a paper web having a film receiving surface composed of a thermoplastic resin, and a coating film in intimate contact with said surface layer, said coating film being composed of a thermoplastic resin different from the thermoplastic resin forming said surface layer, said thermoplastic resins being chosen with respect to each other so as to be mutually insoluble and incompatible and yet readily permeable to a mutual solvent.

3. A composite sheet material for use in applying a decorative coating to a sheet of base material, comprising a supporting web having surface composed of a thermoplastic resin, a layer of a transparent thermoplastic resin different from said first mentioned thermoplastic resin over-lying said web surface and in intimate contact therewith, a layer of colored material overlying said transparent resin layer and comprising a binder of said different thermoplastic resin, and a further layer of said different thermoplastic resin over-lying said layer of colored material, said several layers being made up of mutually soluble resins, chosen so as to be mutually insoluble and incompatible with the thermoplastic surfacing resin and yet permeable to a mutual solvent.

4. A composite sheet material for use in applying a coating film to a sheet of base material, comprising a supporting web having a film receiving surface composed of a film forming resinous material, and a coating film in intimate contact with said web surface, said coating film being composed of a resinous material different from said first mentioned resinous material, said resinous materials being chosen with respect to each other so as to be mutually insoluble and incompatible and yet permeable to a mutual solvent.

5. The composite sheet material claimed in claim 4 wherein said web surface is composed of cellulose acetate and said coating film is composed of a vinyl resin.

6. The composite sheet material claimed in claim 4 wherein said web surface is composed of ethyl cellulose and said coating film is composed of a material selected from the group consisting of vinyl resins and blends of ester gum or nitrocellulose with alkyd resins.

7. The composite sheet material claimed in claim 4 wherein said web surface is composed of vinyl butyral and said coating film is composed of a material selected from the group consisting of cellulose acetate resins.

8. In combination, for the purposes described, a sheet of base material, a coating film composed of a resinous material bonded to said base sheet, and a protective web over-lying said coating film, said protective web having the surface thereof adjacent said coating film composed of resinous material different from the resinous material forming said coating film, said resinous materials being chosen with respect to each other so as to be mutually insoluble and incompatible and yet permeable to a mutual solvent, said coating film being bonded to said base sheet by an adhesive comprising said mutual solvent.

9. A method of laminating a resinous coating film to a sheet of base material which comprises the steps of providing a composite sheet comprising a supporting web having a surface composed of a resinous material and a coating film composed of a different resinous material overlying said web surface and in intimate contact therewith, said web surface and said coating film being mutually insoluble and incompatible and yet permeable to a mutual solvent, laminating said composite sheet to said base sheet by means of an adhesive comprising a mutual solvent for said coating film and said web surface, and thereafter eliminating said mutual adhesive solvent from the resulting lamination while maintaining said supporting web in intimate contact with said coating film.

10. A method of laminating a thermoplastic resin coating film to a sheet of base material which comprises the steps of providing a composite sheet comprising a supporting web having a surface layer composed of a thermoplastic resin and a coating film composed of a different thermoplastic resin in intimate contact with said surface layer, said surface layer and said coating film being mutually insoluble and incompatible and yet permeable to a mutual solvent, laminating said composite sheet to said base sheet by means of an adhesive applied to said coating film and containing a mutual solvent for said thermoplastic resins, and thereafter eliminating said mutual solvent from the resulting lamination while maintaining said supporting web intimate contact with said coating film.

11. The method claimed in claim 10 including the additional step of removing said supporting web at the interface thereof with said coating film following elimination of said mutual solvent so as to leave said coating film exposed.

JOHN S. FRIDOLPH.

References Cited in the file of this patent

UNITED STATES PATENTS

| Number | Name | Date |
|---|---|---|
| 1,379,434 | Yeoell | May 24, 1921 |
| 2,271,491 | Rathke | Jan. 27, 1942 |
| 2,303,395 | Schultz et al. | Dec. 1, 1942 |
| 2,394,701 | Laws | Feb. 12, 1946 |
| 2,410,361 | Prance | Oct. 29, 1946 |
| 2,465,927 | Rapp | Mar. 29, 1949 |
| 2,496,325 | Wittgren | Feb. 7, 1950 |